United States Patent [19]

Hansen

[11] 4,094,805

[45] June 13, 1978

[54] PROTECTING PAVEMENT OR CONCRETE MATERIALS AGAINST THE EFFECTS OF THE DESTRUCTIVE ACTION OF FREEZING AND THAWING OF WATER AND OR BRINE SOLUTIONS

[76] Inventor: Charles Nyberg Hansen, 1448 S. 17th East, Salt Lake City, Utah 84108

[21] Appl. No.: 711,575

[22] Filed: Sep. 23, 1976

[51] Int. Cl.² ............................................. C09K 3/18
[52] U.S. Cl. ...................................... 252/70; 106/13; 427/136
[58] Field of Search ...................... 252/70; 106/13; 427/136; 428/403, 407

[56] References Cited

U.S. PATENT DOCUMENTS

| | | | |
|---|---|---|---|
| 3,293,185 | 12/1966 | Curless et al. | 252/70 |
| 3,666,404 | 5/1972 | Hwa et al. | 252/75 X |
| 3,873,326 | 3/1975 | Kubie | 427/136 X |
| 3,928,654 | 12/1975 | Bonnanzio | 252/70 X |
| 3,944,663 | 3/1976 | Weiss et al. | 252/DIG. 2 X |
| 4,012,537 | 3/1977 | Dubois | 427/136 X |
| 4,049,869 | 9/1977 | De Long | 427/136 X |

*Primary Examiner*—Harris A. Pitlick

[57] ABSTRACT

Methods and compositions for preventing or reducing spalling or degradation of pavement materials, including portland cement concrete and bituminous concrete, when a pavement is subjected to a freezing and thawing action while in contact with water or with de-icing solutions which have been produced by the action of de-icing compounds.

31 Claims, No Drawings

PROTECTING PAVEMENT OR CONCRETE MATERIALS AGAINST THE EFFECTS OF THE DESTRUCTIVE ACTION OF FREEZING AND THAWING OF WATER AND OR BRINE SOLUTIONS

BACKGROUND OF THE INVENTION

1. Field of Invention

This invention relates to compositions and methods of reducing the breakup or spalling which occurs when a pavement is covered with either water or de-icing solutions produced from the action of a de-icing compound and then subjected to the destructive action of the freezing and thawing of these liquids—particularly when removal of snow or ice from pavement is sought.

2. Prior Art

The Operator, Snow Fighter's Handbook for the Utah State Department of Highways, gives the following description of a method for maintaining bare highways during snowfall: "Begin salt application when the ground is BARELY WHITE and it is wet enough to hold the salt on the roadbed. It is really important that the salt is applied at this time because you are doing more than just applying salt—you are forming a brine cushion to 'float' the snow layer on. This brine has two purposes: 1—It melts snow from the pavement up so that snow and ice don't stick to it, and 2—It 'greases' the snow layer so that the snow plows can push it off the road more completely than without it.

"On Type I service you apply straight salt at the rate of 0.25 cubic yards per 2 lane mile or salt-abrasive (1-1 salt-sand) mixture at 0.50 cubic yards per 2 lane mile. Let the salt sit (sic) one hour to develop a brine. Reapply every 6 hours during the storm when the storm lasts that long. Plow the road continuously every one and a half-hours—bare pavement maintenance."

If one quarter cubic yard of salt is estimated to weigh 450 pounds, if it is assumed that when the ground is "barely white" that there is ¼inch of snow and if it is assumed that ten inches of snow is equivalent to one inch of water, the most concentrated brine that would be formed under the described highway practice would be about 2.7 percent by weight sodium chloride. This is also equivalent to 0.00355 pounds of salt per 0.1299 pounds of water per square foot of surface or 0.032 pounds of salt (1/18 cup or 0.45 volumetric ounces) per square yard.

In the February 1973 issue of "Consumer Reports" is found the following directions for keeping the snow off of a sidewalk: "The temperature is within a couple of degrees of freezing, wet snow is falling and the forecast is for a total accumulation of 2 inches: Spread rock salt or calcium chloride at about one cup per square yard to melt the snow as it falls or, shovel."

The Portland Cement Association published in 1968 the "Concrete Information" pamphlet titled "Effect of Various Substances on Concrete and Protective Treatments, Where Required." This pamphlet is a recognized source of information on the known affects that many chemicals have on concrete. With the exception of protective coatings, no mention is made in this pamphlet of any chemical which would protect concrete against the deleterious effects which either freezing and thawing or any chemical may have on concrete. In this pamphlet, the following is said of sodium and calcium chloride: "Frequently used as a de-icer for concrete pavements. If the concrete contains insufficient entrained air or has not been air dried for at least 30 days after completion of curing, repeated application may cause surface scaling."

Under the heading of Miscellaneous and of De-icers, the following statement is made: "Chlorides (calcium and sodium), urea and ethyl alcohol cause scaling of nonair-entrained concrete."

The following protective coatings are listed as treatments to prevent or reduce the damage to concrete from de-icers: "50% solution of boiled linseed oil in kerosene, soybean oil, modified castor oil, sand filled epoxy or coal-tar epoxy."

Volume 323 of the Highway Research Board Bulletin lists a test in which 2.4 pounds of de-icing salt was applied per square yard. (This is 75 times the recommended rate for highways.) In this test after 75 freeze-thaw cycles on air-entrained concrete that contained six percent entrained air, the calcium chloride had produced 4½ times as much spalling as water and sodium chloride had produced 6½ times as much spalling.

SUMMARY OF THE INVENTION

De-icing salts and de-icing solutions, when used to melt snow or ice on a concrete surface, causes the ice or snow to change to the liquid state and to form brine solutions which may vary from about zero percent brine to a saturated brine solution. Part of this solution is absorbed into the concrete, and as the air temperature falls below the freezing temperature of the solution, it freezes in the concrete. As the solution freezes, it expands and creates a stress in the concrete. Any part of the concrete that is stressed beyond its yield point breaks off from the main concrete mass. This destructive action is a force of nature and cannot be eliminated, but this invention modifies this process such that it become substantially less destructive.

It is thus the object of this invention to provide a method and a composition to significantly reduce the breaking up or spalling of concrete. More particularly, it is the object of this invention to reduce the spalling of pavement materials by the addition of polyethylene oxide to any materials which may be applied to the pavement just prior to a thawing and freezing cycle. The most obvious way to apply the polyethylene oxide, such that it is present during the freezing process, is in a snow and ice melting or a de-icing compound.

The types of pavement which have been found to be subject to spalling or break up from a freezing action are portland cement concrete and bituminous concrete. It has been found that by adding polyethylene oxide in such a way that it will be present in the solutions which are in contact with the concrete when the freezing action occurs, the spalling or concrete break up which ordinarily occurs, is significantly reduced.

One purpose of this invention is to treat a de-icing reagent with polyethylene oxide in order to produce a de-icing compound which, while melting the snow or ice, will also reduce the amount of freezing damage that such a compound produces on the sidewalks and roads each year. The polyethylene oxide may also be independently placed directly on the concrete, where the concrete is in contact with or contains water or water solutions which are subject to a freezing and thawing action.

DETAILED DESCRIPTION OF THE INVENTION

One of the great problems of maintaining concrete, especially concrete walkways, roads and highways, is the rate at which the concrete breaks up. The cost of repairing and replacing these surfaces is millions of dollars each year. It is recognized, in the concrete industry that the use of de-icing salts is a major factor in accelerating the rate at which these pavements break up.

While considerable research has been done in an attempt to protect concrete from the destructive affects of the expansion of water or brine solutions as they freeze in concrete, most of this work has been done in the fields of developing protective coatings to prevent the absorption of the water into the concrete or in making an air entrained concrete which cushions the stress placed on the concrete by the freezing water. Little if any work has been done to find compounds which can be added to water or to de-icing salts to make them less destructive. This invention is thus unique in providing a chemical composition, polyethylene oxide, and a method which substantially reduces freezing and thawing damage to concrete.

ACTION OF POLYETHYLENE OXIDE TO REDUCE CONCRETE BREAKUP IN DISTILLED WATER OR IN SOLUTIONS MADE FROM THE DE-ICING SALTS OF SODIUM CHLORIDE, CALCIUM CHLORIDE, UREA OR IN MIXTURES OF THESE COMPOUNDS

It was found that polyethylene oxide has the property of reducing the amount of breakup which occurs when water or a water and a salt solution become absorbed into concrete and then are subjected to freezing and thawing cycles. This is illustrated by Examples 1, 2, 3 and 4.

In Example 1, the freezing damage produced by a distilled water solution, containing 1 percent polyethylene oxide, Polyox WSR 301, was compared with the freezing damage produced by palin distilled water. It was found that the addition of the polyethylene oxide prevented all of the spalling produced by the distilled water alone.

In Example 2, the freezing damage produced by a distilled water solution containing 2.5 percent sodium chloride and 800 ppm of Polyox WSR 301 was compared with the freezing damage produced by 2.5 percent sodium chloride in distilled water. The addition of the 800 ppm of the polyethylene oxide prevented 94 percent of the damage produced by a plain 2.5 percent sodium chloride solution.

Example 3 shows the freezing damage produced by a distilled water solution containing 3.3 percent of a high test calcium chloride, 94 percent to 96 percent anhydrous calcium chloride, plus 800 ppm of Polyox WSR 301 as compared with a plain 3.3 percent high test calcium chloride solution in distilled water. The addition of 800 ppm of the polyethylene oxide prevented 84 percent of the damage produced by a plain 3.3 percent calcium chloride solution.

About 81 percent of the damage produced by a plain 4.5 percent urea solution was saved by adding 800 ppm of Polyox WSR 301 to a comparable 4.5 percent urea solution. This is shown in Example 4.

Example 5 shows the freezing damage to concrete produced by various solutions of calcium chloride and salt, salt and calcium chloride, urea and calcium chloride or of calcium chloride, salt and urea as compared with the same solutions to which was added 800 ppm of Polyox WSR 301. In each comparable pair of solutions, the addition of the polyethylene oxide reduced the freezing damage to the concrete.

THE AMOUNT OF POLYETHYLENE OXIDE AND THE AFFECT OF POLYETHYLENE OXIDE CONCENTRATION ON THE RATE AT WHICH FREEZING CAUSES CONCRETE TO SPALL.

Example 6 shows that increasing concentrations of polyethylene oxide reduces the freezing damage to concrete at all levels of salt concentration tested. This includes 2.5 percent, 6.5 percent, 12.5 percent and 18.5 percent sodium chloride solutions. When combined with the data from Example 1, where 1 percent polyethylene oxide saved 100 percent of the freezing damage from plain distilled water and with Examples 7, 8, 9 where 1 percent polyethylene oxide saved 97 percent, 100 percent and 91 percent of the freezing damage produced by solutions containing 6.25 percent, 16 percent and 10 percent of sodium chloride, calcium chloride and urea respectively, it becomes apparent that the higher the concentration of the polyethylene oxide used the greater the protection there is against freezing damage to concrete.

Examples 10, 11, and 12 show that 100 ppm of polyethylene oxide in 1 percent solutions of sodium chloride, calcium chloride and urea reduced the freezing damage to concrete by 32 percent, 82 percent and 64 percent respectively.

Examples 13, 14, and 15 show that even 50 ppm of polyethylene oxide in 1 percent solutions of sodium chloride, calcium chloride and urea reduced the freezing damage to concrete by 38 percent, 59 percent and 41 percent respectively.

From these examples, it becomes apparent that polyethylene oxide protects concrete against freezing damage at low concentrations and that increasing concentrations give increasing protection. Stated in another manner, the protection against freezing damage is a function of the polyethylene oxide concentration. Example 6 shows that this is a continuous function at all salt concentrations. Examples 1, 7, 8 and 9 show that 91 percent to 100 percent protection is given at a polyethylene oxide concentration of 1 percent. Examples 2, 3 and 4 show that 81 percent to 100 percent protection is given at a polyethylene oxide concentration of 0.08 percent. Examples 10, 11 and 12 show that 32 percent to 82 percent protection is given at a polyethylene oxide concentration of 0.01 percent, and Examples 13, 14 and 15 show that 38 percent to 59 percent protection is given at a polyethylene oxide concentration of 0.005 percent. Averaging these values, the following protection is shown at the indicated concentration of polyethylene oxide:

| Polyethylene Oxide Concentration | Average Percent Protection |
|---|---|
| 1.0 | 97 |
| 0.08 | 88 |
| 0.01 | 59 |
| 0.005 | 46 |

Since the protection is zero at a concentration of zero percent polyethylene oxide and since the curve is continuous and since at the lower concentrations the curve approaches that of a straight line, the expected average protection would be about 46 × 0.001%/0.005% = 9% at a polyethylene oxide concentration of 0.001 percent or 10 ppm.

There appears to be no upper limit to the concentration which would give protection except for the practical limits. The practical limits are imposed from the fact that (1) polyethylene oxide is relatively expensive and it would be impractical to use high concentrations; (2) a maximum of protection is achieved at about one percent concentration with an optimum of protection at about 0.08 percent; (3) the higher molecular weight polyethylene oxides are quite viscous and, at concentrations above about two percent, they become difficult to handle. In the same way, the lower molecular weight polyethylene oxides become difficult to handle at concentrations about about five percent.

THE AMOUNT OF DE-ICING COMPOUND AND THE ADVANTAGES OF USING EACH TYPE OF COMPOUND

The amount of de-icing compound to be used is determined by the need for thawing capacity. One desirable application of a de-icing compound is to produce a de-icing compound solution on the surface of a pavement during a snow storm. Such a solution prevents snow from sticking to the pavement and facilitates the removal of the snow leaving a bare pavement. This is done by applying a small amount of de-icing compound to the pavement when the snow is about ¼ inch or ½ to 1 centimeter deep. Since most snow storms, in the U.S., occur at about the freezing temperature, it is necessary to apply only that amount of de-icing compound that will lower the freezing temperature about 2° to 3° F. or 1° to 2° C. When the snow is ¼ inch deep, if it is considered that 10 inches of snow are equal to one inch of water, it would take about ½ ounce per square yard, or about 17 grams per square meter, of a sodium chloride type of de-icing compound to lower the freezing temperature of water by 2° to 3° F. To do this same job with a high test calcium chloride type of de-icing compound, it would take about ¾ of an ounce per square yard, or 25 grams per square meter, and with a urea type of de-icing compound, it would take about 1 and ¼ ounces per square yard, or 42 grams per square meter.

A frequent need of a de-icing compound is to remove ice from a pavement. This need can exist when the air temperature is about freezing or when the air temperature is down to −50° F. or −45° C. If possible, the best time to try to remove the ice is when the temperatures have moderated as it takes much less de-icing compound to do the job and the rate at which the ice melts is much faster. A frequent recommendation for using snow and ice melters to remove ice is to use about one cup of the snow and ice melter per square yard. A cup of salt weights about 0.63 pounds, or 284 grams. A cup of calcium chloride weights about 0.54 pounds, or 245 grams. A cup of urea weighs about 0.40 pounds or 180 grams. One square yard of ice which is ¼ inch deep weights about 10.73 pounds, or 4870 grams. The brine that would thus be made by dissolving ¼ inch of ice with a cup of de-icing compound would have the following concentrations:

Salt type = 284/(4870 + 284) = 5.5% Sodium chloride solution

Calcium Chloride = 245/(4870 + 245) = 4.8% Calcium chloride

Urea type = 180/(4870 + 180) = 3.6% Urea solution

The brine that would be produced by dissolving ¼ inch of ice with two cups of a calcium chloride or a urea type of de-icing compound is as follows:

Calcium chloride = 490/(4870 + 490) = 9.1% Calcium chloride

Urea type = 360/(4870 + 360) = 6.9% Urea solution

The brines that would be produced by dissolving ¼ inch of ice with three and four cups of a urea type of de-icing compound are as follows:

3 cups urea = 540/(4870 + 540) = 10.0% Urea solution 4 cups urea = 720/(4870 + 720) = 12.9% Urea solution Referring these precentage brines to the freezing points of sodium chloride, calcium chloride and urea, the following table shows the freezing points of the above brines:

| Cups of De-icing Salt Per Square Yard Per ¼ Inch of Ice | Percent Brine | Freezing Point ° C | ° F |
|---|---|---|---|
| 1 cup sodium chloride | 5.5% | −3.15 | 26.3 |
| 1 cup calcium chloride | 4.8 | −1.95 | 28.5 |
| 2 cups calcium chloride | 9.1 | −4.65 | 23.6 |
| 1 cup urea | 3.6 | −0.85 | 30.5 |
| 2 cups urea | 6.9 | −1.75 | 28.9 |
| 3 cups urea | 10.0 | −2.8 | 27 |
| 4 cups urea | 12.9 | −3.95 | 24.9 |

It would thus take between two and three cups of a high test calcium chloride to melt as much ice as 1 cup of sodium chloride. It would take between two and three cups of urea to melt as much ice as 1 cup of calcium chloride and to melt as much ice as 1 cup of sodium chloride does it would take between 3 and 4 cups of urea.

High test calcium chloride has two advantages as a snow and ice melting compound, i.e., an exothermic heat of solution and a low eutectic temperature. Both of these advantages are of the greatest use when the ice has to be melted at cold temperatures. At the higher temperatures that is, above about 20° F or −6.6° C, the amount of calcium chloride needed to melt the ice is relatively small and the heat of solution of the calcium chloride supplies only a small fraction of the heat of fusion needed to melt the ice. At the lower temperatures, the amount of calcium chloride needed to melt the ice becomes substantial and the heat produced from the calcium chloride going into solution becomes substantial. At the extreme example, the eutectic temperature of calcium chloride is −59.5° F or −50.8° C and the eutectic concentration of the calcium chloride is 31.5 percent anhydrous calcium chloride, or 33.2 percent of a high test calcium chloride. At this concentration, it would thus take 33.2 grams of pellet calcium chloride to melt 68.5 grams of ice, or 48.5 grams of high test calcium chloride to melt 100 grams of ice. The heat of fusion to melt 100 grams of ice is 7814 calories. The exothermic heat of solution for 48.5 grams of high test calcium chloride is as follows: 141 cal./gram × 48.5 grams = 6839 calories. In other words, at this extreme temperature, −59.5° F, and concentration of calcium chloride, 31.5 percent, the heat of solution of the calcium chloride would supply 6839 cal./7814 cal. = 87.5 percent of the heat needed to melt the ice.

Urea has an advantage as a de-icing compound in the fact that it contains no chlorides and will not produce chloride toxicity in plants but, on the contrary, contains nitrogen and will stimulate plant growth. It would thus be advantageous to use a urea-type de-icing compound on products in areas where the de-icing solutions will drain onto any growing plants.

An added advantage of urea is the fact that it does not promote the corrosion of steel in concrete like the chlorides do. It would be an advantage to use urea on porches, overpasses, airport runways, and other places which contain reinforcing steel in the concrete.

Example 6 shows that sodium chloride produces the greatest amount of freezing damage at about 12.5 percent and as the salt increases or decreases from that concentration, the freezing damage decreases. This was true at zero ppm of polyethylene oxide and at concentrations of 800 and 1600 ppm of polyethylene oxide. Since the eutectic concentration is the highest concentration of a de-icing salt that will be produced as a de-icing solution freezes, the eutectic concentrations of these salt solutions, 23.1 percent anhydrous sodium chloride, 31.5 percent anhydrous calcium chloride, and 32.5 percent anhydrous urea, would be the highest concentrations for which freeze damage needs to be protected.

RATIO OF SALT TO POLYETHYLENE OXIDE

Example 1 shows that polyethylene oxide is effective in reducing the damage to concrete in the absence of any de-icing salts. Example 6 shows that as the concentration of sodium chloride increases the percent spalling increases up to a maximum of about 12.5 percent sodium chloride. This would indicate that, up to this point, as the solutions freeze in the concrete the stress placed on the concrete increases as the de-icing salt concentration increases. Since increasing concentrations of polyethylene oxide give increasing protections, one would expect that a certain minimum ratio of polyethylene oxide to salt might be needed. Examples 13 and 21 show the results of some tests which were run at low ratios of polyethylene oxide to calcium chloride. It can be seen that the protection given by a ratio of 1/300 is less than that given by a ratio of 1/200, that the protection given by a ratio of 1/200 is less than that given by a ratio of 1/120. As the ratio is reduced toward zero, the protection given drops to zero.

All Molecular Weights of Polyethylene Oxide Were Effective in Reducing The Freezing Damage to Concrete It is possible to form polyethylene oxide molecules of various sizes. An attempt was made to determine the effectiveness of each of the molecules available in reducing the freezing damage to concrete. Tests were made in which the molecules varied in molecular weight from 100,000 to 6,000,000. The tests were run in solutions of sodium chloride, calcium chloride and urea. The results of the tests are shown in Examples 16, 17, 18, 19 and 20.

All molecular weights, of the polyethylene oxides tested, were found to be effective in reducing the freezing damage to concrete. The polyethylene oxides with the larger molecular weights appear to be more effective but Polyox WSRN 750, with a molecular weight of only 300,000, was shown to be surprisingly effective. In each of the three tests, the Polyox WSRN 750 was more effective than the larger molecules WSR 205 and WSR 1105 with molecular weights of 600,000 and 900,000 respectively. In Examples 19 and 20, tests were run of polyethylene oxide compounds which had molecular weights from 100,000 to 400,000. These tests showed that while these compounds are probably not as effective in reducing the freezing damage to concrete they still produce a substantial reduction in the freezing damage.

Types of Surfaces

The test work indicates that this snow and ice melting system will reduce the breakup of any surfaces which will break up under a freezing and thawing condition. Most of the work included in this application, was done on portland cement concrete. Some tests were also run on bituminous cement concrete. The results produced on the bituminous concrete are reported in Example 22. They show that polyethylene oxide reduces the damage which is produced in bituminous concrete by freezing.

Procedure

The following factors affect the performance of concrete: water to cement ratio, cement content, cement type, air entrainment, workability, thorough mixing, proper placing and consolidation, curing time, temperature and humidity. In order to eliminate, as much as possible, the variables that occur in the concrete, all comparative freeze thaw tests were made on the same batches of concrete in the same freeze thaw machine at the same time. The concrete test pieces were all poured from the same batch. Except for Examples 6, 21 and 22, all batches were poured into 3 × 3 × 16 inch molds and were placed on a common platform and the platform was vibrated for 15 seconds in order to achieve equal consolidation. The test pieces were then cured in a 72° F and a 100 percent relative humidity curing room. After curing in this atmosphere, they were then allowed to finish their cure at room temperature and room humidity. The portland cement concrete was made from batches which contained the equivalent of 500 pounds of cement and 300 pounds of water per cubic yard. The aggregate was 40 percent sand and 60 percent gravel.

In Example 6, the concrete was poured into 2 × 2 × 2 inch molds and then treated as described above for the 3 × 3 × 16 inch molds. In Example 21, the text pieces were made from the same batch of concrete and then tamped into small plastic cylinders. They were left in the plastic cylinders for seven days and then air dried for seven days.

In Example 22, the bituminous concrete samples were prepared by the Marshall Method. All comparative freeze thaw tests were made on samples which were mixed for two minutes at 270° to 295° F in a Blakesley Mixer. The compaction was made in a Marshall Compactor at 270° to 280° F and each set of samples, on which comparative freeze thaw tests were run, received the same number of blows.

Method of Application

When the polyethylene oxide is to be used with a de-icing salt or a de-icing compound, it is, in many but not necessarily in all instances, an advantage to mix the polyethylene oxide with the de-icing compound prior to the application. This is relatively easy to accomplish in a dry state as the powdery characteristics of the polyethylene oxide allows it to cling to the particles of de-icing compound. This is particularly true for urea.

If it is found that a dry mix allows too much segregation of the two materials, an excellent product can be produced by adding one or more de-icing compounds to a mixer and, while the mixer is in operation, adding the polyethylene oxide followed by .2 percent to 25 percent of either a water and urea solution or of plain water. This order of mixing works well for materials such as calcium chloride which hydrate readily as it bonds the polyethylene oxide to the surface of the de-icing compound. For such materials as sodium chloride, which do not hydrate readily, the order of mixing is to add water or a water and urea solution to the de-icing compound and allow the surfaces of the de-icing compound to be thoroughly wetted before adding the polyethylene oxide. The mixing operation should be continued until the polyethylene oxide is distributed over the surface of the de-icing compound.

EXAMPLES:

EXAMPLE 1

Example of how polyethylene oxide protects concrete against the freezing damage produced by plain distilled water. Sixty-three freeze thaw cycles with the lowest probe temperature of the cycle at −10° F.**

| Prism No. | Composition of Test Solutions - % by wt. | | Percent Spalling Loss | Percent of Spalling Saved as Compared to Distilled Water |
|---|---|---|---|---|
| 1 | Distilled Water | 100.00 | 2.03 | |
| 4 | Distilled Water | 99.00 | 0.00 | 100.00 |
|   | Polyox WSR 301 | 1.00 | | |
|   | Total | 100.00 | | |

Note that the polyethylene oxide, without the presence of any de-icing compound, protects the concrete against spalling.

**It was found on this particular Cordon Type Freeze Thaw Machine that when the lowest probe temperature reading was 26° F. the temperature of the solution surrounding the test piece was about 18° F. and the temperature of the freezing plate was about −10° F. At a probe temperature of 28° F., the solution temperature was about 20° F. and the plate temperature was about −8° F. By extrapolating this same −36° F. difference between the probe temperature and the plate temperature and the −8° F. difference between the probe temperature and the solution temperature, it is estimated that when the probe temperature was −10° F., the freezing plate temperature was −46° F. and the solution temperature was −18° F.

EXAMPLE 2

Example of how polyethylene oxide protects concrete against the freezing damage produced by a sodium chloride brine solution produced from a sodium chloride de-icing compound. Fifty-four freeze thaw cycles with the lowest probe temperature of the cycle at about −4° F.**

| Prism No. | Composition of Test Solutions - % by wt. | | Percent Spalling Loss | Percent of Spalling Saved as Compared to a 2.5% NaCl Solution |
|---|---|---|---|---|
| 1 | Distilled Water | 97.5 | 27.9 | |
|   | NaCl | 2.5 | | |
|   | Total | 100.0 | | |
| 5 | Distilled Water | 97.42 | | |
|   | NaCl | 2.50 | | |
|   | Polyox WSR 301 | .08 | 1.6 | 94% |
|   | Total | 100.00 | | |

Note that the polyethylene oxide, in the presence of sodium chloride, reduces the freezing damage to concrete.

EXAMPLE 3

Example of how polyethylene oxide protects concrete against the freezing damage produced by a calcium chloride brine solution produced from a calcium chloride de-icing compound. Fifty-five freeze thaw cycles with the lowest probe temperature of the cycle at about −8° F.**

| Prism No. | Composition of Test Solutions - % by wt. | | Percent Spalling Loss | Percent of Spalling Saved as Compared to a 3.3% CaCl$_2$ Solution |
|---|---|---|---|---|
| 1 | Distilled Water | 96.7 | 4.62 | |
|   | CaCl | 3.3 | | |
|   | Total | 100.0 | | |
| 2 | Distilled Water | 96.62 | | |
|   | CaCl$_2$ | 3.30 | | |
|   | Polyox WSR 301 | .08 | 0.76 | 84% |
|   | Total | 100.00 | | |

Note that the polyethylene oxide, in the presence of calcium chloride, reduces the freezing damage to concrete.

EXAMPLE 4

Example of how polyethylene oxide products concrete against the freezing damage produced by a urea solution produced from a urea de-icing compound. Fifty freeze thaw cycles with the lowest probe temprature of the cycle at about −4° F.**

| Prism No. | Composition of Test Solutions - % by wt. | | Percent Spalling Loss | Percent of Spalling Saved as Compared to a 4.5% Urea Solution |
|---|---|---|---|---|
| 1 | Distilled Water | 95.5 | 16.9 | |
|   | Urea | 4.5 | | |
|   | Total | 100.0 | | |
| 2 | Distilled Water | 95.42 | | |
|   | Urea | 4.50 | 3.2 | 81% |
|   | Polyox WSR 301 | 0.08 | | |
|   | Total | 100.00 | | |

Note that the polyethylene oxide in the presence of urea reduces the freezing damage to concrete.

EXAMPLE 5

Example of how polyethylene oxide reduces the freezing damage to concrete produced by mixtures of sodium chloride, calcium chloride and urea. Forty-five freeze thaw cycles with the lowest probe temperature of the cycle at about 0° F.**

| Prism No. | Composition of Test Solutions - % by wt. | | Percent Spalling Loss | Percent of Spalling Saved by the Addition of Polyethylene Oxide |
|---|---|---|---|---|
| 1 | Distilled Water | 96.8 | 17.0 | |
|   | NaCl | 1.7 | | |
|   | Urea | 1.5 | | |
|   | Total | 100.0 | | |
| 2 | Distilled Water | 96.72 | | |
|   | NaCl | 1.70 | 1.4 | 92% |
|   | Urea | 1.50 | | |
|   | Polyox WSR 301 | 0.08 | | |
|   | Total | 100.00 | | |
| 3 | Distilled Water | 96.3 | 10.2 | |
|   | CaCl$_2$ | 2.2 | | |
|   | Urea | 1.5 | | |
|   | Total | 100.0 | | |
| 4 | Distilled Water | 96.22 | | |
|   | CaCl$_2$ | 2.20 | | |
|   | Urea | 1.50 | 1.5 | 86% |
|   | Polyox WSR 301 | 0.08 | | |
|   | Total | 100.00 | | |
| 5 | Distilled Water | 96.57 | | |
|   | NaCl | 0.83 | | |
|   | CaCl$_2$ | 1.10 | 15.3 | |
|   | Urea | 1.50 | | |
|   | Total | 100.0 | | |
| 6 | Distilled Water | 96.49 | | |
|   | NaCl | 0.83 | | |
|   | CaCl$_2$ | 1.10 | 0.93 | 94% |
|   | Urea | 1.50 | | |

-continued

Example of how polyethylene oxide reduces the freezing damage to concrete produced by mixtures of sodium chloride, calcium chloride and urea. Forty-five freeze thaw cycles with the lowest probe temperature of the cycle at about 0° F.**

| Prism No. | Composition of Test Solutions - % by wt. | | Percent Spalling Loss | Percent of Spalling Saved by the Addition of Polyethylene Oxide |
|---|---|---|---|---|
| | Polyox WSR 301 | 0.08 | | |
| | Total | 100.0 | | |
| | Distilled Water | 97.2 | | |
| | NaCl | 1.7 | | |
| 7 | CaCl$_2$ | 1.1 | 6.0 | |
| | Total | 100.0 | | |
| | Distilled Water | 97.12 | | |
| | NaCl | 1.70 | | |
| | CaCl$_2$ | 1.10 | 2.1 | 65% |
| | Polyox WSR 301 | 0.08 | | |
| | Total | 100.00 | | |
| | Distilled Water | 96.89 | | |
| | NaCl | 0.83 | | |
| 9 | CaCl$_2$ | 2.20 | 0.72 | 92% |
| | Polyox WSR 301 | 0.08 | | |
| | | 100.00 | | |
| | Distilled Water | 96.97 | | |
| 10 | NaCl | 0.83 | 8.7 | |
| | CaCl$_2$ | 2.20 | | |
| | Total | 100.00 | | |

Note that in are comparsions of various mixtures of various de-icing compounds with and without the polyethylene oxide. These mixtures include sodium chloride and calcium chloride, calcium chloride and urea, urea and sodium chloride as well as a mixture of sodium chloride, calcium chloride and urea. All the mixtures were designed to have about the same freezing temperature.

EXAMPLE 6

This example shows the comparative freeze thaw damage produced at four salt concentrations and at three levels of concentrations of polyethylene oxide, including 0% polyethylene oxide, 0.08% and 0.16%. Fifty freeze thaw cycles with the lowest probe temperature of the cycle at about −4° F.** on 2 × 2 × 2 portland cement concrete prisms.

| Prism No. | Percent Distilled Water | Percent Sodium Chloride | Percent Polyox WSR 301 | Percent Spallings | Percent Spallings Saved as Compared with the same Percentage of Salt but no Polyethylene Oxide |
|---|---|---|---|---|---|
| 1 | 97.50 | 2.5 | 0.00 | 42.3 | |
| 2 | 97.42 | 2.5 | 0.08 | 32.0 | 24% |
| 3 | 97.34 | 2.5 | 0.16 | 21.3 | 50% |
| 4 | 93.50 | 6.5 | 0.00 | 56.2 | |
| 5 | 93.42 | 6.5 | 0.08 | 44.4 | 21% |
| 6 | 93.34 | 6.5 | 0.16 | 21.3 | 62% |
| 7 | 87.50 | 12.5 | 0.00 | 100.0 | |
| 8 | 87.42 | 12.5 | 0.08 | 61.6 | 38% |
| 9 | 87.34 | 12.5 | 0.16 | 34.3 | 66% |
| 10 | 81.5 | 18.5 | 0.00 | 46.1 | |
| 11 | 81.42 | 18.5 | 0.08 | 29.8 | 35% |
| 12 | 81.34 | 18.5 | 0.16 | 15.2 | 67% |

Note that increasing concentrations of polyethylene oxide reduces the freezing damage to concrete at all concentrations of salt tested. This example also indicates that salt produces the greatest damage at about 12.5% and the concentration increases or decreases from that concentration the freezing damage decreases. This was true at all three concentrations of polyethylene oxide. Note also that Prism 7, which was in a plain 12.5% sodium chloride solution, was run to total destruction. This happened because the smaller prisms break up much more rapidly than do the 3 × 3 × 16 inch prisms. If the test had been stopped earlier, there would probably have been more difference shown between the destruction on this prism and on the comparative prisms.

EXAMPLE 7

An example of the protection against freezing damage to concrete produced by a high concentration of polyethylene oxide in a moderately high concentration of a sodium chloride brine produced from a sodium chloride de-icing salt. Fifty-five freeze thaw cycles with the lowest probe temperature of the cycle at about −8° F.**

| Prism No. | Composition of Test Solutions — % by wt. | | Percent Spalling Loss | Percent of Spalling Saved as compared to a 6.25% NaCl Solution |
|---|---|---|---|---|
| | Distilled Water | 93.75 | | |
| 11 | NaCl | 6.25 | 14.0 | |
| | Total | 100.00 | | |
| | Distilled Water | 92.75 | | |
| | NaCl | 6.25 | | |
| 12 | Polyox WSR 301 | 1.00 | 0.46 | 97% |
| | Total | 100.00 | | |

Note the almost complete protection given to the concrete by the addition of 1 percent of polyethylene oxide in a 6.25 percent sodium chloride solution.

EXAMPLE 8

An example of the protection against freezing damage to concrete produced by a high concentration of polyethylene oxide in a high concentration of calcium chloride brine produced from a calcium chloride de-icing salt. Sixty-three freeze thaw cycles with the lowest probe temperature of the cycle at about −10° F.**

| Prism No. | Composition of Test Solutions — % by wt. | | Percent Spalling Loss | Percent of Spalling Saved as compared to a 16% Calcium Chloride Solution |
|---|---|---|---|---|
| | Distilled Water | 83.0 | | |
| | CaCl$_2$ | 16.0 | | |
| 9 | Polyox WSR 301 | 1.0 | 0.0 | 100% |
| | Total | 100.0 | | |
| | Distilled Water | 84.0 | | |
| 10 | CaCl | 16.0 | 0.37 | |
| | Total | 100.0 | | |

Note the apparently complete protection given to the concrete by the addition of 1 percent of polyethylene oxide in a 16 percent calcium chloride solution.

EXAMPLE 9

An example of the protection against freezing damage to concrete produced by a high concentration of polyethylene oxide in a relatively high concentration of urea solution produced from a urea de-icing salt. Fifty freeze thaw cycles with the lowest probe temperature of the cycle at about −4° F.**

| Prism No. | Composition of Test Solution — % by wt. | | Percent Spalling Loss | Percent of Spalling Saved as Compared to a 10% Urea Solution |
|---|---|---|---|---|
| | Distilled Water | 89.0 | | |
| | Urea | 10.0 | | |
| 10 | Polyox WSR 301 | 1.0 | 0.57 | 91% |
| | Total | 100.0 | | |
| | Distilled Water | 90.0 | | |
| 11 | Urea | 10.0 | 6.57 | |
| | Total | 100.00 | | |

Note the relatively high percentage of protection against freezing damage to the concrete which is produced by a high percentage of polyethylene oxide in a relatively high urea solution.

EXAMPLE 10

An example of the reduction in the freezing damage to concrete produced by a low concentration, 100 ppm, of polyethylene oxide in a low concentration, 1 percent, sodium chloride brine which is in turn formed by a sodium chloride de-icing salt. Fifty-five freeze thaw cycles with the lowest probe temperature of the cycle at about −8° F.**

| Prism No. | Composition of Test Solutions — % by wt. | | Percent Spalling Loss | Percent of Spalling Saved as compared to a 1.0% Sodium Chloride Solution |
|---|---|---|---|---|
| 11 | Distilled Water | 99.0 | | |
| | NaCl | 1.0 | 8.54 | |
| | Total | 100.0 | | |
| 8 | Distilled Water | 98.99 | | |
| | NaCl | 1.00 | | |
| | Polyox WSR 301 | 0.01 | 5.82 | 32% |
| | Total | 100.00 | | |

Note that even 100 ppm of polyethylene oxide reduces the freeze thaw damage to concrete in a 1 percent sodium chloride solution.

EXAMPLE 11

An example of the reduction in freezing damage to concrete produced by a low concentration, 100 ppm, of polyethylene oxide in a 1 percent calcium chloride brine solution produced from a calcium chloride de-icing salt. Fifty freeze thaw cycles with the lowest probe temperature of the cycle at about −4° F.**

| Prism No. | Composition of Test Solutions — % by wt. | | Percent Spalling Loss | Percent of Spalling Saved as compared to a 1.0% Calcium Chloride Solution |
|---|---|---|---|---|
| 8 | Distilled Water | 98.99 | | |
| | CaCl$_2$ | 1.00 | 1.04 | 82% |
| | Polyox WSR 301 | 0.01 | | |
| | Total | 100.00 | | |
| 9 | Distilled Water | 99.0 | | |
| | CaCl$_2$ | 1.0 | 5.82 | |
| | Total | 100.0 | | |

Note that 100 ppm of polyethylene oxide reduced the damage to concrete in a 1 percent calcium chloride solution by a surprising 82 percent.

EXAMPLE 12

An example of the reduction in freezing damage to concrete produced by a low concentration, 100 ppm, of polyethylene oxide in a 1 percent urea solution produced by a urea de-icing compound. Forty-five freeze thaw cycles with the lowest probe temperature of the cycle at about 0° F.**

| Prism No. | Composition of Test Solutions — % by wt. | | Percent Spalling Loss | Percent of Spalling Saved as compared to a 1% Urea Solution |
|---|---|---|---|---|
| 11 | Distilled Water | 98.99 | | |
| | Urea | 1.00 | | |
| | Polyox WSR 301 | 0.01 | 1.9 | 64% |
| | | 100.00 | | |
| 12 | Distilled Water | 99.0 | | |
| | Urea | 1.0 | 5.3 | |
| | | 100.0 | | |

Note that 100 ppm of polyethylene oxide reduced the damage to concrete in a 1 percent urea solution by 64 percent.

EXAMPLE 13

An example of the protection against the freezing damage to concrete produced by a low concentration, 50 ppm, of polyethylene oxide in a 1 percent sodium chloride brine produced from a sodium chloride de-icing salt. Sixty-two freeze thaw cycles at the lowest probe temperature of the cycle at about −3° F.**

| Prism No. | Composition of Test Solutions — % by wt. | | Percent Spalling | Percent of Spalling Saved as compared to a 1% Sodium Chloride Solution |
|---|---|---|---|---|
| 1 | Distilled Water | 99.0 | | |
| | NaCl | 1.0 | 2.6 | |
| | Total | 100.0 | | |
| 2 | Distilled Water | 98.995 | | |
| | NaCl | 1.000 | | |
| | Polyox WSR 301 | 0.005 | 1.6 | 38% |
| | | 100.000 | | |

Note that with the addition of only 50 ppm of polyethylene oxide and with a ratio of polyethylene oxide to sodium chloride of only 1/200, the spalling was reduced by 38 percent.

EXAMPLE 14

An example of the protection against the freezing damage to concrete produced by a low concentration, 50 ppm, of polyethylene oxide in a 1 percent calcium chloride brine produced from a calcium chloride de-icing salt Sixty-two freeze thaw cycles with the lowest probe temperature of the cycle at about −3° F.**

| Prism No. | Composition of Test Solutions — % by wt. | | Percent Spalling Loss | Percent of Spalling Saved as compared to a 1.0% Calcium Chloride Solution |
|---|---|---|---|---|
| 3 | Distilled Water | 99.0 | | |
| | CaCl$_2$ | 1.0 | 1.0 | |
| | Total | 100.0 | | |
| 4 | Distilled Water | 98.995 | | |
| | CaCl$_2$ | 1.000 | | |
| | Polyox WSR 301 | 0.005 | 0.41 | 59% |
| | | 100.000 | | |

Note that with the addition of only 50 ppm of polyethylene oxide and with a ratio of polyethylene oxide to calcium chloride of only 1/200, the spalling was reduced by 59 percent.

EXAMPLE 15

An example of the protection against the freezing damage to concrete produced by a low concentration, 50 ppm, of polyethylene oxide in a 1 percent urea solution produced from a urea de-icing compound. Sixty-two freeze thaw cycles at the lowest probe temperature of the cycle at about −3° F.**

| Prism No. | Composition of Test Solutions — % by wt. | | Percent Spalling Loss | Percent of Spalling Saved as compared to a 1.0% Urea Solution |
|---|---|---|---|---|
| 5 | Distilled Water | 99.0 | | |
| | Urea | 1.0 | 3.2 | |
| | | 100.0 | | |
| 6 | Distilled Water | 98.995 | | |
| | Urea | 1.000 | | |
| | Polyox WSR 301 | 0.005 | 1.9 | 41% |
| | | 100.000 | | |

Note that with the addition of only 50 ppm of polyethylene oxide and with a ratio of polyethylene oxide to urea of only 1/200, the spalling was reduced by 41 percent.

EXAMPLE 16

An example of the protection against freezing damage to concrete that is given by various solutions of polyethylene oxide of various molecular weights in a 2.5 percent sodium chloride solution. Fifty-four freeze thaw cycles with the lowest probe temperature -continued of each cycle at about −4° F.**
Except for the solution on Prism No. 1, each
of the solutions had the following compositions:
Distilled Water 97.42
NaCl 2.50
Polyethylene oxide 0.08
Total 100.00
The solution of Prism No. 1 had the following composition:
Distilled Water 97.5
NaCl 2.5
100.0

| Prism No. | Name of Polyethylene Oxide Compound | Molecular Weight of the Polyethylene Oxide Compound | Percent Spalling | Percent Spalling Saved |
|---|---|---|---|---|
| 1 | None | NOne | 27.9 | None |
| 2 | Polyox WSRN 750 | $0.3 \times 10^6$ | 5.3 | 81% |
| 3 | Polyox WSR 205 | $0.6 \times 10^6$ | 6.4 | 77% |
| 4 | Polyox WSR 1105 | $0.9 \times 10^6$ | 6.0 | 78% |
| 5 | Polyox WSR 301 | $4.0 \times 10^6$ | 1.6 | 94% |

Note that the highest molecular weight compound gave the greatest amount of protection against freeze thaw damage but that the lowest molecular weight compound gave the second greatest amount of protection.

EXAMPLE 17

An example of the protection against freezing damage
to concrete that is given by various solutions of
polyethylene oxide of various molecular weights in a 3.3
percent calcium chloride solution. Fifty-five freeze
thaw cycles with the lowest probe temperature
of each cycle at about −8° F.**
Except for the solution on Prism No. 1,
each of the solutions had the following compositions:
Distilled Water 96.62
Calcium Chloride 3.30
Polyethylene Oxide 0.08
Total 100.0
The solution on Prism No. 1 had the following composition:
Distilled Water 96.7
Calcium Chloride 3.3
Total 100.0

| Prism No. | Name of Polyethylene Oxide Compound | Molecular Weight of the Polyethylene Oxide Compound | Percent Spalling | Percent Spalling Saved |
|---|---|---|---|---|
| 1 | None | None | 4.62 | None |
| 2 | Polyox WSR 301 | $4.0 \times 10^6$ | 0.76 | 84% |
| 3 | Polyox WSR 1105 | $0.9 \times 10^6$ | 2.01 | 56% |
| 4 | Polyox WSR 205 | $0.6 \times 10^6$ | 2.37 | 49% |
| 5 | Polyox WSRN 750 | $0.3 \times 10^6$ | 1.59 | 66% |

Note that the compound with the highest molecular weight gave the greatest amount of protection against freezing damage but that the compound with the lowest molecular weight gave the next to the greatest amount of protection.

EXAMPLE 18

An example of the protection against freezing damage
to concrete that is given by various solutions of
polyethylene oxide of various molecular weights in a 4.5
percent solution of urea. Fifty freeze thaw cycles with
the lowest probe temperature of each cycle at about −4° F.**
Solution No. 1 was of the following composition:
Distilled Water 95.5
Urea 4.5
Total 100.0
The other solutions were of the following composition:
Distilled Water 95.45
Urea 4.50
Polyethylene Oxide 0.08
Total 100.00

| Prism No. | Name of Polyethylene Oxide Compound | Molecular Weight of the Polyethylene Oxide Compound | Percent Spalling | Percent Spalling Saved |
|---|---|---|---|---|
| 1 | None | None | 16.9 | None |
| 2 | Polyox WSR 301 | $4.0 \times 10^6$ | 3.2 | 81% |
| 3 | Polyox WSR 1105 | $0.9 \times 10^6$ | 9.5 | 44% |
| 4 | Polyox WSR 205 | $0.6 \times 10^6$ | 8.1 | 52% |
| 5 | Polyox WSRN 750 | $0.3 \times 10^6$ | 4.0 | 76% |
| 6 | Polyox FRA | $6.0 \times 10^6$ | 4.8 | 72% |

Note that the compound with the highest molecular weight, Polyox FRA, did not give the greatest amount of protection against freezing damage but the compound with the next to the highest molecular weight was the most effective while the compound with the lowest molecular weight gave the next to the greatest amount of protection.

EXAMPLE 19

An example of the protection against freezing damage
to concrete that is given by the lower molecular weight
polyethylene oxide compounds in a sodium chloride based de-icing
formula. Sixty-seven freeze thaw cycles with the lowest
probe temperature of the cycle at about 0° F.**
Solution No. 1 was of the following composition:
Distilled Water 97.5
Sodium Chloride 2.5
Total 100.0
The other solutions were of the following composition:
Distilled Water 97.42
Sodium Chloride 2.50
Polyethylene Oxide 0.08
Total 100.00

| Prism No. | Name of Polyethylene Oxide Compound | Molecular Weight of the Polyethylene Oxide Compound | Percent Spalling | Percent Spalling Saved |
|---|---|---|---|---|
| 1 | None | None | 7.0 | None |
| 2 | Polyox WSRN 3000 | $0.4 \times 10^6$ | 2.5 | 64% |
| 3 | Polyox WSRN 80 | $0.2 \times 10^6$ | 2.5 | 64% |
| 4 | Polyox WSRN 10 | $0.1 \times 10^6$ | 2.8 | 60% |

Note that even the lower molecular weight compounds of poly-ethylene oxide reduce the freezing damage to concrete.

EXAMPLE 20

An example of the protection against freezing damage to concrete
that is given by the lower molecular weight polyethylene oxide
compounds in a calcium chloride based de-icing formula. Sixty-
seven freeze thaw cycles with the lowest probe
temperature of the cycle at about 0° F.**
Solution No. 5 was of the following composition:
Distilled Water 96.7
Calcium Chloride 3.3
Total 100.0
The other solutions were of the following composition:
Distilled Water 96.62
Calcium Chloride 3.30
Polyethylene Oxide 0.08
Total 100.00

| Prism No. | Name of Polyethylene Oxide Compound | Molecular Weight of the Polyethylene Oxide Compound | Percent Spalling | Percent Spalling Saved |
|---|---|---|---|---|
| 5 | None | None | 2.3 | None |
| 6 | Polyox WSRN 3000 | $0.4 \times 10^6$ | 1.3 | 43% |
| 7 | Polyox WSRN 80 | $0.2 \times 10^6$ | 1.1 | 52% |
| 8 | Polyox WSRN 10 | $0.1 \times 10^6$ | 0.9 | 60% |

Note that this test confirms the results shown in Example 19. The lower molecular weight compounds of polyethylene oxide reduce the freezing damage to concrete.

EXAMPLE 21

An example of the protection against freezing damage to concrete that is given with a low ratio of pieces, one freezing cycle at about 0° F.**
Composition of Test

| Prism No. | Distilled Water | Hi-Test Calcium Chloride | Polyox WSR 301 | Ratio Polyox CaCl$_2$ | Percent Spalling | Percent Spalling Saved |
|---|---|---|---|---|---|---|
| 1 | 92.5 | 7.5 | 0.00 | 0 | 0.71 | 0.0 |
| 2 | 92.475 | 7.5 | 0.025 | 1/300 | 0.47 | 34% |
| 3 | 92.4375 | 7.5 | 0.0625 | 1/120 | 0.37 | 48% |

Note that a ratio of polyethylene oxide to calcium chloride of 1/300 gave protection against freezing damage and as the ratio becomes larger, 1/120, the amount of protection given increases.

EXAMPLE 22

An example of the protection against freezing damage that is given to bituminous concrete by polyethylene oxide. Two-hundred-forty freeze thaw cycles with the lowest probe temperature of the cycle at −4° to −10° F.**

| Prism No. | Composition of Test Solutions — % by wt. | | Percent Spalling Loss | Percent of Spalling Saved as Compared to a 4.5% Urea Solution |
|---|---|---|---|---|
| 1 | Distilled Water | 95.42 | 0.78 | 80% |
| | Urea | 4.50 | | |
| | Polyox WSR 301 | 0.08 | | |
| | Total | 100.00 | | |
| 2 | Distilled Water | 95.5 | 3.86 | |
| | Urea | 4.5 | | |
| | Total | 100.0 | | |

Note that polyethylene oxide reduces the freezing damages to bituminous concrete.

EXAMPLE 23

Example of a method for making a batch of a de-icing mixture which contains Pellet (94 percent to 96 percent anhydrous calcium chloride) Calcium Chloride: Polyox WSR 301 as the source of polyethylene oxide and urea as a source of nitrogen as a plant growth stimulant.

The batch which was made, contained ten pounds, dry weight. The mixture was designed to contain 1.5 percent polyethylene oxide and 1.0 percent nitrogen from urea. The following percentages and weights were used:

| Name of Chemical | Percent by Weight | Weight Pounds | Grams |
|---|---|---|---|
| Pellet Calcium Chloride | 96.3 | 9.63 | 4368.2 |
| Polyox WSR 301 | 1.5 | 0.15 | 68.0 |
| 50% Water — 50% Urea Solution | 2.2 | 0.22 | 99.8 |
| Total | 100.0 | 10.00 | 4536.0 |

The mixing procedure was as follows: 4368.2 grams of calcium chloride and 68 grams of Polyox WSR 301 were weighed into a mixing container. After thoroughly mixing the calcium chloride and the Polyox, a 50 percent solution of urea in water was sprayed onto this mixture and the mixing process was continued until the water-urea solution was thoroughly dispersed over the surface of the calcium chloride pellets and at the same time bonding the Polyox to the calcium chloride to produce a dry, free flowing product.

EXAMPLE 24

Example of a method of making a batch of a de-icing mixture which contains sodium chloride crystals, Polyox WSRN 750 as the source of polyethylene oxide and urea as a source of nitrogen as a plant growth stimulant.

The batch which was made, contained ten pounds, dry weight. The mixture was designed to contain 2.5 percent polyethylene oxide and 1.0 percent nitrogen from urea. The following percentages and weights were used:

| Name of Chemical | Percent by Weight | Weight Pounds | Grams |
|---|---|---|---|
| Sodium Chloride Crystals | 96.4 | 9.63 | 4372.7 |
| Polyox WSRN 750 | 2.5 | 0.25 | 113.4 |
| Urea Prills | 1.1 | 0.11 | 49.9 |
| Total | 100.0 | 10.00 | 4536.0 |

The mixing procedure was as follows: 4372.7 grams of sodium chloride and 49.9 grams of urea prills were weighed into a mixing container. After thoroughly mixing the sodium chloride and the urea, the Polyox WSRN 750 was spred over the mixture and the mixing process was continued until the Polyox was thoroughly dispersed over the surface of the salt and the urea to produce a dry, free flowing product.

EXAMPLE 25

Example of a method of making a batch of a de-icing mixture which contains urea as the de-icing compound that will not produce chloride toxicity in plants nor will it corrode reinforcing steel in concrete, plus Polyox WSRN 3000 as the source of polyethylene oxide. The following percentages and weights were used:

| Name of Chemical | Percent by Weight | Weight Pounds | Grams |
|---|---|---|---|
| Urea Prills | 98.3 | 9.83 | 4458.9 |
| Polyox WSRN 3000 | 1.7 | 0.17 | 77.1 |
| Total | 100.0 | 10.00 | 4536.0 |

The mixing procedure was as follows: 4458.9 grams of urea prills were weighed into a mixing container and the Polyox was slowly added to the urea while blending the two products. The mixing process was continued until the Polyox was thoroughly dispersed over the surface of the urea to produce a dry, free-flowing product.

EXAMPLE 26

Example of a method for making a batch of a de-icing mixture which contains Flake Calcium Chloride (77 percent to 80 percent anhydrous calcium chloride) and Polyox WSRN 750 as the source of the polyethylene oxide with water as the agent to bond the polyethylene oxide to the calcium chloride.

The batch which was made, contained ten pounds. The mixture was designed to contain 1.2 percent polyethylene oxide. The following percentages and weights were used:

| Name of Chemical | Percent by Weight | Weight Pounds | Grams |
|---|---|---|---|
| Flake Calcium Chloride | 97.8 | 9.78 | 4436.2 |
| Polyox WSRN 750 | 1.2 | 0.12 | 54.4 |
| Water | 1.0 | 0.10 | 45.4 |
| Total | 100.0 | 10.00 | 4536.0 |

The mixing procedure was as follows: 4436.2 grams of flake calcium chloride and 54.4 grams of Polyox WSRN 750 were weighed into a mixing container. After thoroughly mixing the calcium chloride and the Polyox, the water was sprayed onto the mixture and the mixing process was continued until the water had been thoroughly dispersed over the surface of the calcium chloride and at the same time bonding the Polyox to the calcium chloride to produce a dry, free-flowing product.

EXAMPLE 27

Example of a method for making a solution which contains Polyox WSR N-750 as the source of polyethylene oxide and water as the solvent.

The batch which was made contained ten pounds. The solution was designed to contain 5.0 percent polyethylene oxide. The following percentages and weights were used:

| Name of Chemical | Percent by Weight | Weight Pounds | Grams |
|---|---|---|---|
| Water | 95.0 | 9.5 | 4309 |
| Polyox WSR N-750 | 5.0 | 0.5 | 227 |
| Total | 100.0 | 10.0 | 4536 |

The mixing procedure was as follows: 4309 grams of water were added to a mixing vessel. The speed of a 3-Blade Paddle Stirrer was turned up to about 700 rpm to produce a large vortex in the water. The Polyox was slowly added to the water. After the Polyox had been completely added to the water, the speed of the stirrer was turned down to about 300 rpm until sufficient viscosity had been developed in the solution to hold the undissolved particles in suspension, after which the stirrer was turned down to 60 rpm and the stirring process was continued until the Polyox was completely in solution.

EXAMPLE 28

Example of a method for making a de-icing solution which contains sodium chloride, as the de-icing reagent, Polyox WSR N-3000, as the source of polyethylene oxide and water as the solvent.

The batch which was made contained ten pounds. The mixture was designed to contain 0.7 percent polyethylene oxide. The following percentages and weights were used.

| Name of Chemical | Percent by Weight | Weight Pounds | Grams |
|---|---|---|---|
| Water | 73.3 | 7.33 | 3325 |
| Sodium Chloride | 26.0 | 2.60 | 1179 |
| Polyox WSR N-3000 | 0.7 | 0.07 | 32 |
| Total | 100.0 | 10.00 | 4536 |

The mixing procedure was as follows: 3325 grams of water were added to a mixing vessel. While stirring, 1179 grams of salt were added. After the salt was in solution, the mixture was speeded up to produce a vortex in the solution and the Polyox was slowly added into the vortex to produce a dispersion of Polyox in the salt solution.

EXAMPLE 29

Example of a method for making a de-icing solution which contains calcium chloride as the de-icing reagent, Polyox WSR 301 as the source of polyethylene oxide and water as the solvent.

The batch which was made contained ten pounds. The solution was designed to contain 0.5 percent polyethylene oxide. The following percentages and weights were used:

| Name of Chemical | Percent by Weight | Weight Pounds | Grams |
|---|---|---|---|
| Water | 64.5 | 6.45 | 2926 |
| Calcium Chloride | 35.0 | 3.50 | 1588 |
| Polyox WSR 301 | 0.5 | 0.05 | 23 |
| Total | 100.0 | 10.00 | 4537 |

The mixing procedure was as follows: 2926 grams of water were added to a mixing vessel. While stirring, 1588 grams of calcium chloride were added. After the calcium chloride was in solution, the mixer was speeded up to produce a vortex in the solution and the Polyox was slowly added into the vortex to produce a solution of Polyox in the calcium chloride solution.

EXAMPLE 30

Example of a method for making a de-icing solution which contains urea as the de-icing reagent, Polyox WSR N-750 as the source of polyethylene oxide and water as the solvent.

The batch which was made contained 10 pounds. The solution was designed to contain 0.9 percent polyethylene oxide. The following percentages and weights were used:

| Name of Chemical | Percent by Weight | Weight Pounds | Grams |
|---|---|---|---|
| Water | 49.1 | 4.91 | 2227 |
| Urea | 50.0 | 5.00 | 2268 |
| Polyox WSR N-750 | 0.9 | 0.09 | 41 |
| Total | 100.0 | 10.00 | 4536 |

The mixing procedure was as follows: 2227 grams of water were added to a mixing vessel. While stirring, 2268 grams of urea were added. After the urea was in solution, the mixer was speeded up to produce a vortex in the solution and the Polyox was slowly added into the vortex to produce a dispersion of Polyox in the urea solution.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. An aqueous or dry composition to be applied to the surface of concrete to reduce the damage resulting from the freezing of solutions formed by the action of de-icing compositions, on water, snow or ice in contact with the concrete, comprising a homopolymer of ethylene oxide with a molecular weight of 100,000 or more and one or more de-icing reagents from the group of sodium chloride, calcium chloride and urea; wherein the polyethylene oxide is present in amounts which reduce the damage caused to concrete resulting from the action of said de-icing reagents with the proviso that when sodium chloride is the sole de-icing reagent said aqueous composition so applied must contain at least 2.5 percent sodium chloride.

2. The composition of claim 1 wherein the de-icing reagent in the de-icing composition which lowers the freezing temperature of water or melts the ice or snow comprises sodium chloride.

3. The composition of claim 1 wherein the de-icing reagent in the de-icing composition which lowers the freezing temperature of water or which melts the ice or snow comprises calcium chloride.

4. The composition of claim 1 wherein the de-icing reagent in the de-icing composition which lowers the freezing temperature of water or which melts the ice or snow comprises urea.

5. The conposition of claim 1 wherein the de-icing reagent in the de-icing composition which lowers the freezing temperature of water or which melts the ice or snow comprises sodium chloride plus calcium chloride.

6. The composition of claim 1 wherein the de-icing reagent in the de-icing composition which lowers the freezing temperature of water or which melts the ice or snow comprises sodium chloride plus urea.

7. The composition of claim 1 wherein the de-icing reagent in the de-icing composition which lowers the freezing temperature of water or which melts the ice or snow comprises calcium chloride plus urea.

8. The composition of claim 1 wherein the de-icing reagent in the de-icing composition which lowers the freezing temperature of water of which melts the ice or snow comprises sodium chloride plus calcium chloride plus urea.

9. A composition to be applied to the surface of concrete to reduce freezing damage to the concrete comprising a solution of water plus one or more de-icing reagents from the group of sodium chloride, calcium chloride and urea plus a homopolymer of ethylene oxide with a molecular weight of 100,000 or more present in amounts which reduce the damage caused to concrete resulting from the action of said de-icing reagents with the proviso that when sodium chloride is the sole de-icing reagent said composition so applied must contain at least 2.5 percent sodium chloride.

10. The composition of claim 9 wherein the polyethylene oxide content ranges up to on the order of 10,000 parts per million and the de-icing reagent comprises sodium chloride and ranges up to on the order of 23.1 percent of the solution.

11. The composition of claim 9 wherein the polyethylene oxide content ranges up to on the order of 10,000 parts per million and the de-icing reagent comprises calcium chloride and ranges up to on the order of 31.5 percent of the solution.

12. The composition of claim 9 wherein the polyethylene oxide content ranges up to on the order of 10,000 parts per million and the de-icing reagent comprises urea and ranges up to on the order of 32.5 percent of the solution.

13. The composition of claim 9 wherein the polyethylene oxide content ranges up to on the order of 10,000 parts per million and the de-icing reagent comprises sodium chloride and calcium chloride and the sodium chloride ranges up to on the order of 23.1 percent of the solution while the calcium chloride ranges up to on the order of 31.5 percent of the solution.

14. The composition of claim 9 wherein the polyethylene oxide content ranges up to on the order of 10,000 parts per million and the de-icing reagents comprises sodium chloride and urea and the sodium chloride ranges up to on the order of 23.1 percent of the solution while the urea ranges up to on the order of 32.5 percent of the solution.

15. The composition of claim 9 wherein the polyethylene oxide content ranges up to on the order of 10,000 parts per million and the de-icing reagents comprises calcium chloride and urea and the calcium chloride ranges up to on the order of 31.5 percent of the solution while the urea ranges up to on the order of 32.5 percent of the solution.

16. The composition of claim 9 wherein the polyethylene oxide content ranges up to on the order of 10,000 parts per million and the de-icying reagents comprises sodium chloride, calcium chloride and urea and the sodium chloride ranges up to on the order of 23.1 percent of the solution, the calcium chloride ranges up to on the order of 31.5 percent of the solution and the urea ranges up to on the order of 32.5 percent of the solution.

17. A dry de-icing composition comprising at least 0.01 percent homopolymer of ethylene oxide with a molecular weight of 100,000 or more which has been mixed with or coated onto up to 99.99 percent of a de-icing reagent selected from the group consisting of sodium chloride, calcium chloride, urea or any combination of these de-icing reagents.

18. A de-icing solution or suspension composition comprising 0.01 to 50 percent homopolymer of ethylene oxide with a molecular weight of 100,000 or more which has been dissolved or suspended in a solution of water and up to the saturation concentration of a de-icing reagent selected from the group consisting of sodium chloride, calcium chloride, urea or any combination of these de-icing reagents with the proviso that when sodium chloride is the sole de-icing reagent said solution or suspension composition must contain at least 2.5 percent sodium chloride.

19. A method of reducing the destructive action of the freezing of water in concrete, which comprises applying to the surface of the concrete, in such a manner and at such a time that it is present during the freezing process, either a dry homopolymer of ethylene oxide with a molecular weight of 100,000 or more or an aqueous solution of said polymer, such that the aqueous solution in contact with the concrete is in the range of up to on the order of 10,000 parts per million of polyethylene oxide.

20. A method of reducing the destructive action of the freezing in concrete of water or of aqueous solutions which are produced by the action of de-icing compositions on snow or ice, which comprises applying to the surface of the concrete, in such a manner and at such a time that it is present during the freezing process, a dry homopolymer of ethylene oxide with a molecular weight of 100,000 or more, an aqueous solution of said polyethylene oxide, dry de-icing reagents mixed with or coated with the named polyethylene oxide or an aqueous solution of de-icing reagents and said polyethylene oxide such that the resultant formed upon contact with the concrete consists of up to on the order of 10,000 parts per million of said polyethylene oxide and when said de-icing reagents are also applied, additionally consists of up to on the order of the eutectic composition of each individual de-icing reagent present with water, said de-icing reagents being selected from one or more of the group consisting of sodium chloride, calcium chloride and urea.

21. The method of claim 20 wherein the de-icing reagent is applied and is sodium chloride, and has a eutectic composition with water of 23.1 percent sodium chloride.

22. The method of claim 20 wherein the de-icing reagent is applied and is calcium chloride, and has a eutectic composition with water of 31.5 percent anhydrous calcium chloride.

23. The method of claim 20 wherein the de-icing reagent is applied and is urea, and has a eutectic composition with water of 32.5 percent anhydrous urea.

24. The method of claim 20 wherein the de-icing reagents are applied and are sodium chloride plus calcium chloride and with water these reagents form separate eutectics and have eutectic compositions of up to on the order of 23.1 percent sodium chloride and up to on the order of 31.5 percent anhydrous calcium chloride.

25. The method of claim 20 wherein the de-icing reagents are applied and are sodium chloride plus urea, and with water these reagents form separate eutectics and have eutectic compositions of up to on the order of 23.1 percent sodium chloride and up to on the order of 32.5 percent anhydrous urea.

26. The method of claim 20 wherein the de-icing reagents are applied and are calcium chloride plus urea, and with water these reagents form separate eutectics and have eutectic compositions of up to on the order of 31.5 percent anhydrous calcium chloride and up to on the order of 32.5 percent anhydrous urea.

27. The method of claim 20 wherein the de-icing reagents are applied and are sodium chloride plus calcium plus urea, and with water these reagents form separate eutectics and have eutectic compositions of up to on the order of 23.1 percent sodium chloride, up to on the order of 31.5 percent anhydrous calcium chloride and up to on the order of 32.5 percent anhydrous urea.

28. A method of claim 20 wherein said concrete comprises portland cement concrete.

29. A method of claim 20 wherein said concrete comprises bituminous concrete.

30. A method of reducing the destructive action which the freezing of water or of solutions produced by de-icing compositions have on concrete which comprises applying a de-icing composition comprising 0.01 to 100 percent homopolymer of ethylene oxide with a molecular weight of 100,000 or more which has been mixed with or coated onto 0.00 to 99.99 percent of a de-icing reagent selected from the group consisting of sodium chloride, calcium chloride, urea or any combination of these de-icing reagents, to a concrete surface for the purpose of de-icing the concrete and at the same time to protect the concrete from some of the destructive action which would ordinarily occur if a conventional de-icing composition were applied to the concrete prior to a freezing or a thawing and a freezing cycle, and which method of application is performed in such a manner and at such a time that the contained polyethylene oxide is present during the freezing process.

31. A method of reducing the destructive action which the freezing of water of of solutions produced by de-icing compositions have on concrete which comprises applying to the concrete surface a de-icing water solution or suspension comprising 0.01 to 50 percent homopolymer of ethylene oxide with a molecular weight of 100,000 or more and 0.00 to the saturation concentration of a de-icing reagent selected from the group consisting of sodium chloride, calcium chloride, urea or any combination of these de-icing reagents and which method of application is performed in such a manner and at such a time that the contained polyethylene oxide is present and active during the freezing process.

* * * * *